US008141239B2

(12) United States Patent
Rogge

(10) Patent No.: US 8,141,239 B2
(45) Date of Patent: Mar. 27, 2012

(54) DRIVE ASSEMBLY FOR A SLEEVE HOUSING DEVICE IN A MAGAZINE

(75) Inventor: Guenter Rogge, Lienen (DE)

(73) Assignee: Windmoeller & Hoelscher KG, Lengerich (DE)

( * ) Notice: Subject to any disclaimer, the term of this patent is extended or adjusted under 35 U.S.C. 154(b) by 425 days.

(21) Appl. No.: 12/311,740

(22) PCT Filed: Oct. 5, 2007

(86) PCT No.: PCT/EP2007/060587

§ 371 (c)(1), (2), (4) Date: Apr. 10, 2009

(87) PCT Pub. No.: WO2008/043714

PCT Pub. Date: Apr. 17, 2008

(65) Prior Publication Data

US 2010/0024209 A1 Feb. 4, 2010

(30) Foreign Application Priority Data

Oct. 10, 2006 (DE) ......................... 10 2006 048 140

(51) Int. Cl.
*B23Q 7/10* (2006.01)

(52) U.S. Cl. ..... 29/809; 29/895.1; 29/426.3; 29/402.08; 29/402.09; 29/402.11; 101/479; 101/477; 414/331.14; 414/331.11

(58) Field of Classification Search ................. 29/895.1, 29/809, 426.3, 402.08, 402.09, 402.11; 101/477, 101/479; 414/331.14, 331.11, 495, 608
See application file for complete search history.

(56) References Cited

U.S. PATENT DOCUMENTS

| | | | | |
|---|---|---|---|---|
| 4,823,693 | A * | 4/1989 | Kobler | 101/218 |
| 5,188,027 | A * | 2/1993 | Fantoni | 101/216 |
| 5,289,769 | A * | 3/1994 | Lewis | 101/218 |
| 5,638,754 | A * | 6/1997 | Steinmeier et al. | 101/477 |
| 5,715,749 | A * | 2/1998 | Miller | 101/477 |
| 6,142,073 | A * | 11/2000 | Zeman et al. | 101/216 |
| 6,386,103 | B1 * | 5/2002 | Charette et al. | 101/375 |
| 6,463,648 | B2 * | 10/2002 | Gottling et al. | 29/426.1 |
| 6,918,732 | B2 * | 7/2005 | Jendroska et al. | 414/331.14 |
| 7,117,793 | B2 * | 10/2006 | Petersen et al. | 101/477 |
| 7,331,288 | B2 * | 2/2008 | Gottling et al. | 101/480 |
| 7,370,581 | B2 * | 5/2008 | Plasswich et al. | 101/477 |
| 7,762,187 | B2 * | 7/2010 | Petri | 101/375 |
| 2002/0056392 | A1 * | 5/2002 | Sameit et al. | 101/484 |
| 2002/0129720 | A1 | 9/2002 | Jendroska et al. | |
| 2003/0213389 | A1 * | 11/2003 | Kolbe et al. | 101/382.1 |

(Continued)

FOREIGN PATENT DOCUMENTS

DE 101 12 522 A1 9/2002

(Continued)

*Primary Examiner* — Essama Omgba
(74) *Attorney, Agent, or Firm* — Jacobson Holman PLLC

(57) ABSTRACT

A system for changing sleeves that can be pushed onto ink transfer roller cores of a printing machine includes at least one magazine, at least one travel device, and a drive. The magazine includes at least one sleeve mounting device that is movable relative to a frame of the magazine. The travel device is connectable to the magazine so that the magazine is movable in the vertical and/or horizontal direction. The drive, which is a component of the travel device, provides a drive force or drive torque to move the sleeve mounting device relative to the frame of the magazine.

11 Claims, 6 Drawing Sheets

U.S. PATENT DOCUMENTS

| | | | | |
|---|---|---|---|---|
| 2005/0139109 | A1* | 6/2005 | Plasswich et al. ............ | 101/477 |
| 2005/0257705 | A1 | 11/2005 | Petersen et al. | |
| 2008/0134919 | A1* | 6/2008 | Jendroska et al. ............ | 101/479 |
| 2009/0028613 | A1 | 1/2009 | Plasswich et al. | |

FOREIGN PATENT DOCUMENTS

| | | | |
|---|---|---|---|
| DE | 102 23 414 | A1 | 1/2004 |
| DE | 102006048140 | B3 * | 4/2008 |
| WO | WO 2006/013046 | A1 | 2/2006 |

* cited by examiner

Fig. 4
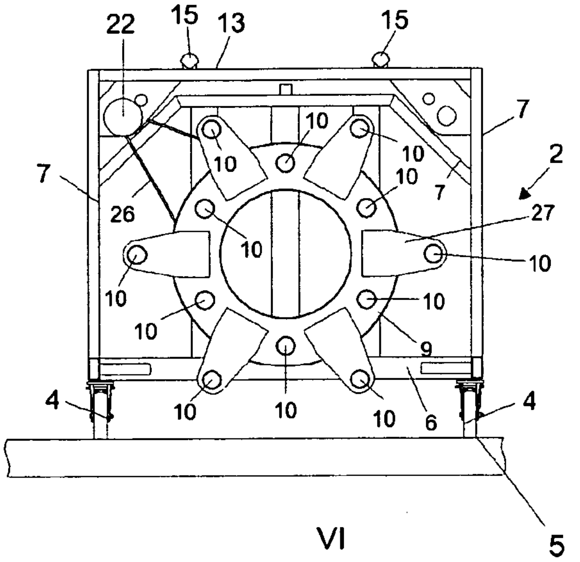
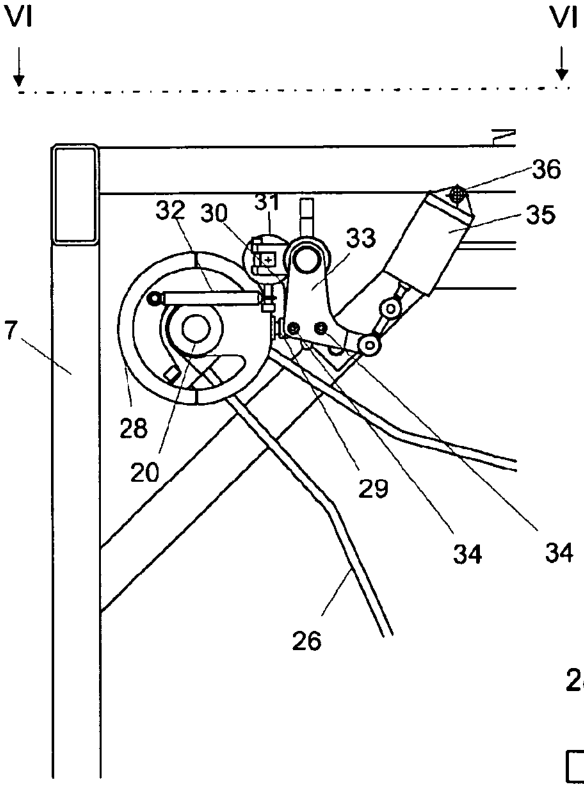
Fig. 5
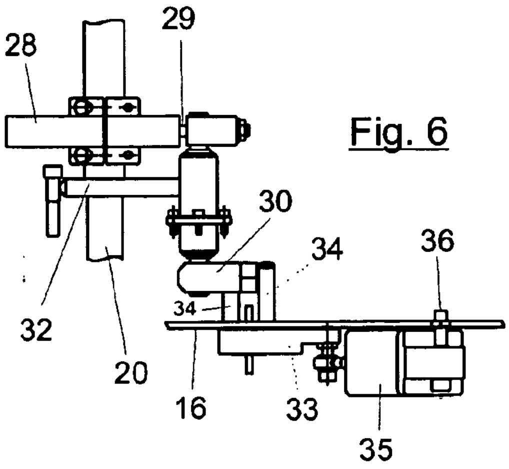
Fig. 6

DRIVE ASSEMBLY FOR A SLEEVE HOUSING DEVICE IN A MAGAZINE

CROSS-REFERENCE TO RELATED APPLICATION

This is a national stage of PCT/EP07/060587 filed Oct. 5, 2007 and published in German, which has a priority of German no. 10 2006 048 140.2 filed Oct. 10, 2006, hereby incorporated by reference.

BACKGROUND OF THE INVENTION

1. Field of Invention

The invention concerns a system for changing sleeves that can be pushed onto ink transfer roller cores.

2. Description of the Prior Art

In different printing machines, the complete ink transfer rollers that participate in the printing process need not be changed when the printing machine, for example, must be set up for a subsequent order. Such printing machines are often equipped with ink transfer roller cores mounted on one end, at least during setup. Sleeves, which carry the actual print motif, can be pushed onto these cores and removed from them again. Several sleeves can then be pushed one above the other, in which the inner sleeves are referred to as adapter sleeves. Ink transfer rollers, in the context of the invention, are to be understood to mean all rollers that transport a fluid necessary for printing in the printing process, especially printing ink. In flexographic printing, these are the anilox rollers and the format cylinders carrying the print motifs.

The sleeves of the ink transfer rollers can be very heavy and must sometimes be pushed at great height onto the corresponding cores. The Patent Application of the applicant, DE 101 12 522 A1, therefore proposes to use a magazine with sleeve mounting devices designed as support cores for transport of the cores of the printing machine. This magazine is equipped with wheels, so that it can be moved without other technical aids. The magazine can be connected laterally to a lifting platform, so that it can be raised and lowered with it. With this system, a sleeve can be raised to the level of the ink transfer roller, on which the sleeve is to be pushed. Likewise, a sleeve mounting device can be raised to the level of an ink transfer roller set up with a sleeve, in order to be able to remove the sleeve from the ink transfer roller core and transported away.

Another such system can be deduced from the Patent Application of the applicant, DE 102 23 414 A1, in which the magazine can be connected to a travel device. With this travel device, the magazine can be moved in the vertical and/or horizontal direction, in order to be able to position a sleeve mounting device of the magazine relative to the printing machine, so that the axis of the sleeve, when supported by the sleeve mounting device, is flush with the axis of the ink transfer roller core being setup or removed. In a variant of the magazine depicted there, the sleeve mounting devices are movable relative to the magazine. For this purpose, the sleeve mounting devices are arranged on a disk that can be rotated within the magazine.

The disk can be rotated by a motor fastened in the magazine frame, in order to be able to position the sleeve mounting devices with reference to the ink transfer roller cores.

Since several magazines are often used to set up a printing machine, equipping each magazine with a drive leads to high overall costs.

SUMMARY OF THE INVENTION

The task of the present invention is therefore to propose a generic system for changing sleeves that can be pushed onto ink transfer roller cores, which is cost-effective in acquisition and operation and simple to operate.

This task is solved according to the invention by the features of the invention described herein. Accordingly, it is proposed that the drive be a component of the travel device and is not included by the magazine. An effective connection can then be made between the drive and the sleeve mounting device, which is mounted in the magazine and can be moved relative to it. The drive is then in effective connection with the sleeve mounting device for its movement, when the magazine is connected to the travel device. In this way, a single drive can be provided, whereas several magazines are usable, all of which get by without their own drive. For positioning of the sleeve mounting device in front of an ink transfer roller core, the drive must be precisely positionable. A corresponding control and regulation of the drive can be implemented most cost-effectively, if the drive, as described, remains in the area of the printing machine.

The magazine, which is advantageously provided with wheels, can also be moved more easily, since, in comparison with a magazine known from the prior art, the weight of the drive drops out. Another advantage of such a magazine is that initially at least one empty sleeve mounting device can be positioned in front of a set-up ink transfer roller. After removal of the corresponding sleeve, only one sleeve mounting device of the magazine needs to be moved now and not the travel device, in order to position the sleeve to be mounted in front of the core.

In an advantageous modification of the invention, the drive includes a motor, for example, an electric motor, on whose rotor shaft a drive pinion is fastened. The torque made available by such a motor can be taken off by components arranged on the magazine, for example, by a rack that engages with the gears of the travel device, when the magazine is connected to the travel device.

It is a particular advantage, if the magazine includes a gear for take-off of the torque, which meshes with the pinion when the magazine is connected.

Advantageously, the gear is fastened on a shaft, with which the torque can be conveyed. In magazines, the torque can be required at a location distant from the location, at which the gear and pinion mesh. Transfer of the torque can be accomplished in the most simple manner with such a shaft.

In an advantageous embodiment of the invention, the at least one sleeve mounting device is fastened to a disk, which is mounted to rotate in the frame of the magazine. By means of such a disk, starting from the shaft, which can be acted upon with a torque, the sleeve mounting device can be moved in a simple fashion. For this purpose, only the disk needs to be equipped with a drive gear, which is connected to the shaft via an appropriate means of transmission, for example, a drive chain.

Additional practical examples of the invention follow from the substantive description and claims.

BRIEF DESCRIPTION OF THE DRAWINGS

The individual figures show:

FIG. 4: View of the section IV-IV in FIG. 1.

FIG. 5: Detailed view of a locking and unlocking device.

FIG. 6: View of section VI-VI in FIG. 5.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
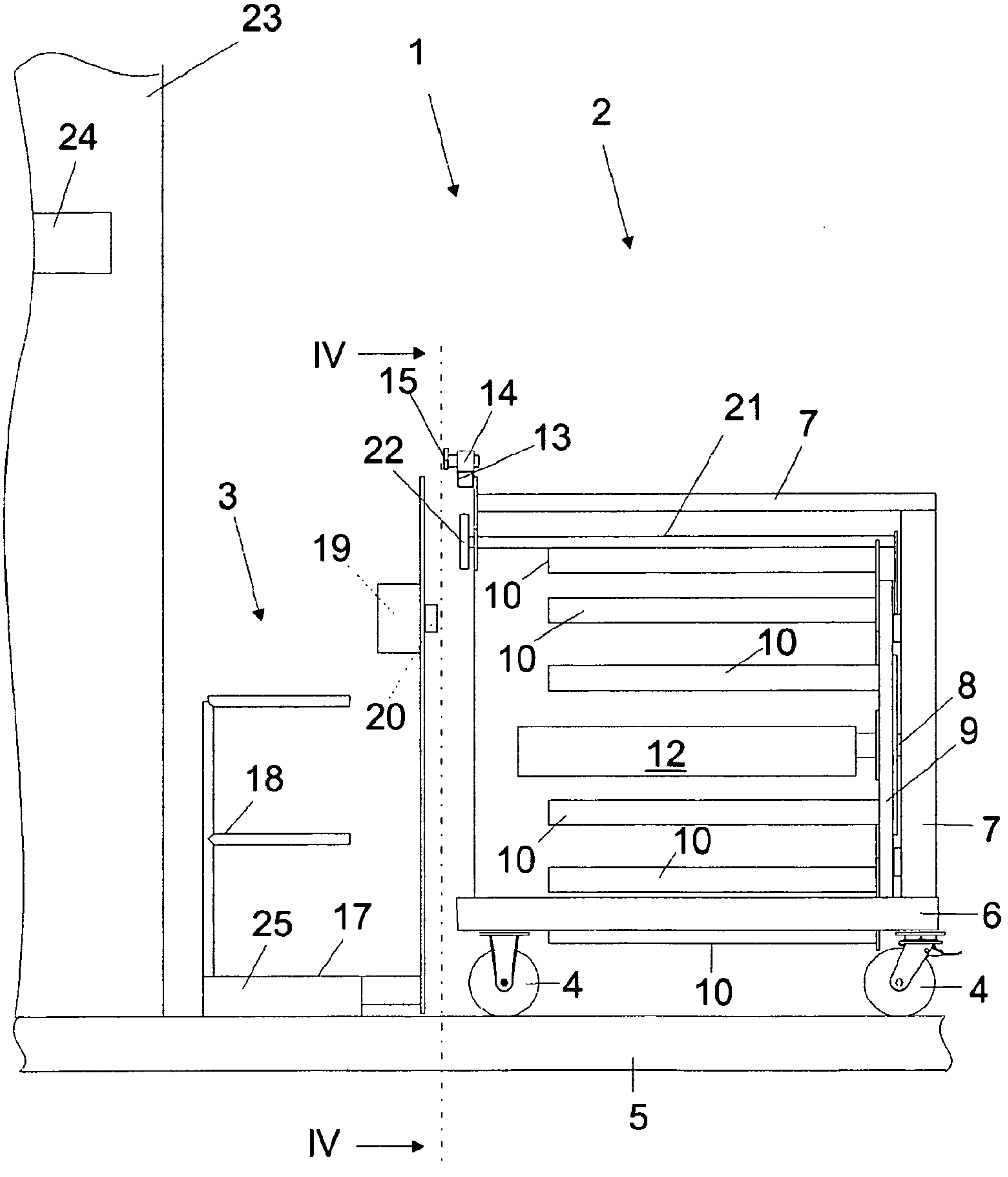
FIG. 1: Side view of a system according to the invention before the magazine was positioned for coupling.

FIG. 1 shows a side view of the system 1 according to the invention, which includes a magazine 2 and a travel device 3.

The magazine 2 is equipped with wheels 4, so that it can be moved on the shown floor 5. The wheels 4 are arranged beneath a base frame 6. A support frame 7 is mounted on the base frame, which consists of several individual parts, for example, welded together. A rotary disk 9 is mounted to rotate in the support frame 7 via a bearing 8. Several rod-like sleeve mounting devices 10 are mounted on one end on the rotary disk 9, which are often referred to as support cores. For example, a sleeve 12 that can be pushed onto an ink transfer roller core is shown, which is pushed onto the sleeve mounting device 11 for transport to the printing machine.

The rotary disk 9 is connected via a transmission device to a shaft 21, which extends outside the support frame 7. Such transmission devices can be gears or gear/chain combinations. On the end of the shaft extending beyond the side of support frame 7, a gear 22 is mounted. Acting upon gear 22 with a torque therefore leads to rotation of the rotary disk 9, so that in this way the sleeve mounting devices 10, 11 can be moved relative to the magazine. The gear 22 can be fastened in a defined angular position in a manner described further below.

On the top of support frame 7 of magazine 2, a cross-frame 13 is fastened on the side lying opposite the rotary disk 9, on which support pins 14 are fastened, only one of which is visible. On the front of the support pins 14 facing away from magazine 2, plates 15, enlarged in cross-section relative to it, are fastened, so that support pin 14 and plate 15 together form a hook. The pin and plate can also be made in one piece. The entire magazine 2 can be raised from the floor 5 via the support pin 14.

The travel device 3 includes a platform 25, which, among other things, serves to move the operating personnel in front of the printing head of the printing machine 23 to be set up. An individual ink transfer roller core 24 of the printing machine 23 is schematically shown as an example in FIG. 1. For this purpose, the platform 25 can be moved by a crane. The crane can include a rail that runs in front of the printing machine (not further shown), on which slides movable in the horizontal direction run. These slides can be equipped with lifting devices, which engage on the platform, and with which the platform can be raised and lowered in the vertical direction.

Figure 2A:
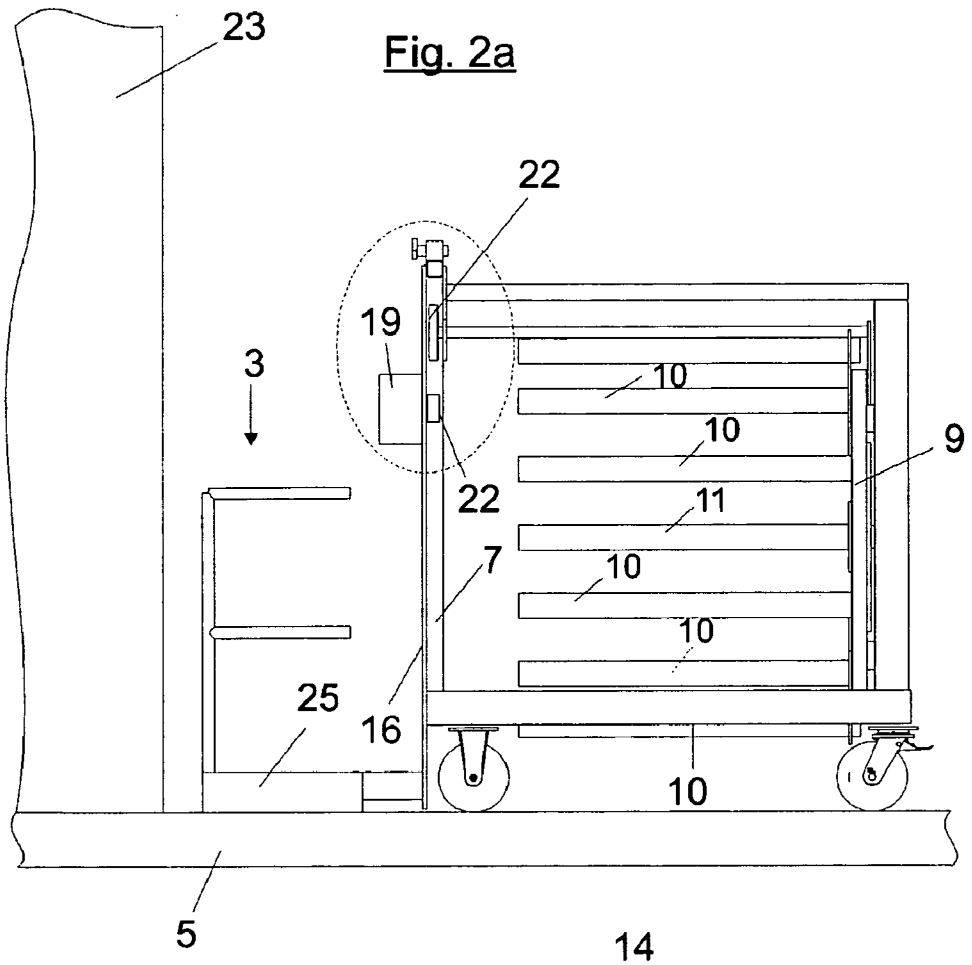
FIG. 2*a*: Side view of a system according to the invention after the magazine was positioned for coupling.
Figure 2B:
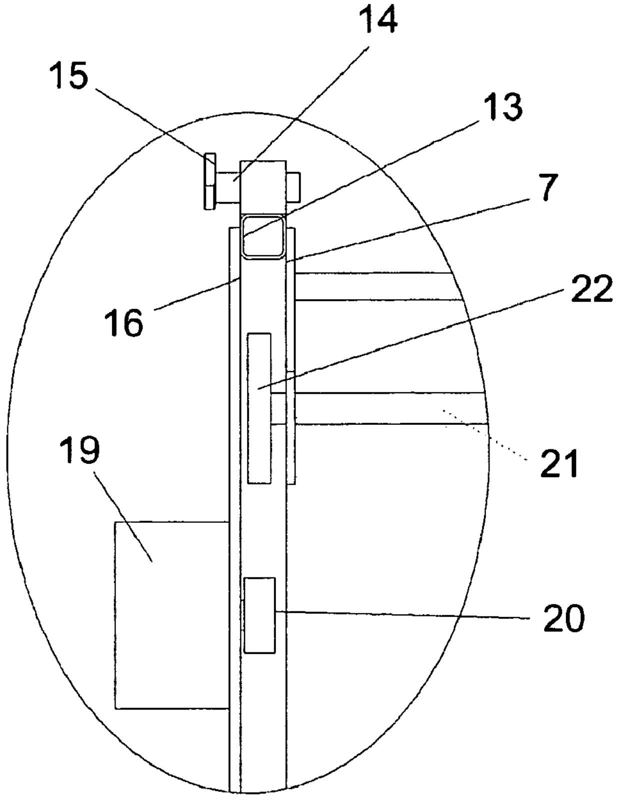
FIG. 2*b*: Enlargement of the content of the ellipse in FIG. 2*a*.
Figure 3A:
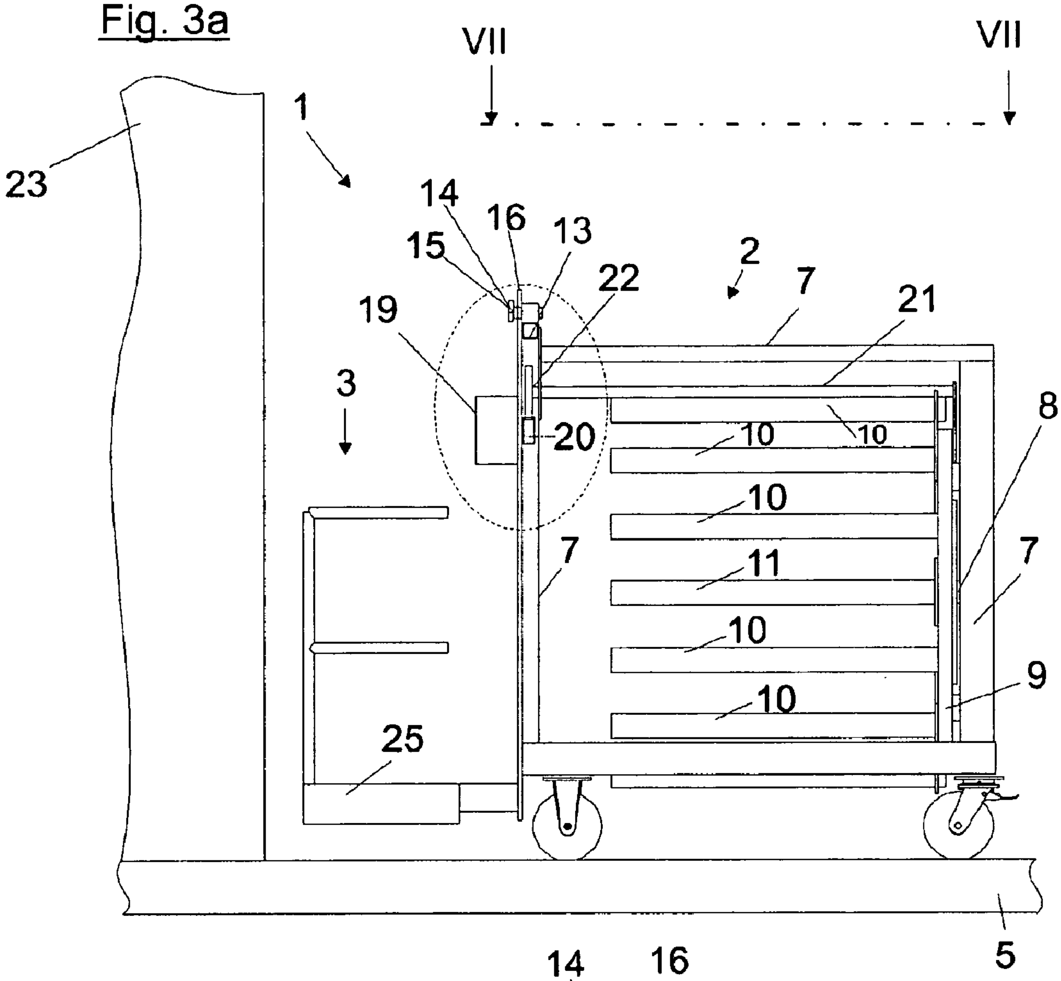
FIG. 3*a*: Side view of a system according to the invention after the magazine was coupled to the travel device.
Figure 3B:
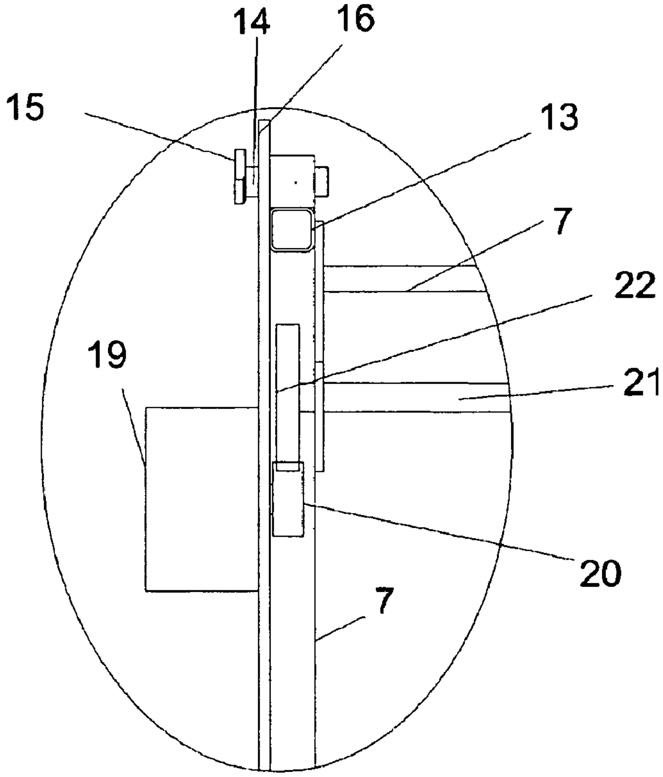
FIG. 3*b*: Enlargement of the content of the ellipse of FIG. 3*a*.

A protective grate 18 is provided on the platform 25. In addition, a front wall 16 is fastened to the platform, which runs perpendicular to the standing surface 17 of the platform 25. Instead of wall 16, a frame, consisting of different profiles, can also be provided. On the upper end of wall 16, upward open mounts (not visible) are provided, which can accommodate the support pins 14 of magazine 2, in which the plates 15 engage behind the wall, so that after coupling, movement of the magazine 2 relative to the travel device is prevented. For coupling of the magazine 2, this is positioned relative to the travel device, so that the plates 15 extend behind the wall, when viewed from the side. This situation is depicted in FIGS. 2*a* and 2*b*. Either the travel device 2 and/or the magazine 3 is then pushed far enough, so that the pins 14 are positioned vertically above the mounts. The travel device is then raised until the support pins 14 are accommodated by the mounts (see FIGS. 3*a* and 3*b*).

A drive motor 19, for example, an electric motor, is attached to wall 16. The motor is fastened on the inside of the wall in the depicted practical example, the driveshaft of the drive motor 19 passing through wall 16. A pinion 20 is fastened to the driveshaft on the side of the wall facing away from motor 19. The angular position of the motor 19 is adjustable, so that the pinion can be brought into a defined angular position, in which the teeth of the pinion 20 and the teeth of gear 22, which is fastened in a defined angular position during the coupling process, can mesh with each other without striking each other. After coupling of magazine 2 to travel device 3, the disk 9 can be rotated by rotating the drive motor 19. Through an appropriate movement, at least one of the sleeve mounting devices 10, 11 can be positioned in front of the ink transfer roller core 24, so that the axis of the sleeve, when positioned on the sleeve mounting device, is flush with the axis of the ink transfer roller core 24. In this case, the sleeve 12 can be moved back and/or forth by means of a simple axial displacement between the sleeve mounting device 11 and the ink transfer roller core. Movement of the sleeve mounting devices 10, 11 can then include a lifting and/or lowering movement, a travel movement in the horizontal direction orthogonal to the axes of the ink transfer roller cores 24, as well as a rotational movement of the rotary disk 9.

FIG. 4 shows view IV-IV from FIG. 1, in which the same components have the same reference numbers. The front side of magazine 2 seen in this view is open, so that the sleeve mounting devices 10 can be equipped from this side with sleeves and the sleeves removed. The rotary disk 9 supports the sleeve mounting devices 10 partly via tabs 27.

Torque transfer from shaft 21, which cannot be seen in this view, occurs to the rotary disk 9 via a chain 26. A toothed belt or gears could just as well be provided at this location.

FIG. 5 shows a locking and unlocking device, with which movement of the rotary disk 9 can be prevented or enabled. For this purpose, an additional disk 28 is fastened to shaft 20, in which a radial hole is made. This hole could also be made in another component connected to the shaft or in shaft 21 itself. A securing pin 29 can be introduced to this hole, which is connected in the peripheral direction to disk 28 unmovable with the support frame 7. Because of this, rotation of the shaft, and therefore ultimately the rotary disk 9, is prevented. For this purpose, the securing pin 29 is fastened to a lever arm 30, which is mounted to rotate in a bearing 31. A spring 32 acts on the lever arm 30, which is connected with one of its ends to the support frame 7 in a manner not shown and acts upon the lever arm with a force directly radially toward the shaft. In this way, it is ensured that the securing pin 29 does not inadvertently slide out from the hole. If the rotary disk is now to be rotated, merely a force directed against a spring force must be applied, which moves the lever arm 30. The securing pin 29 is therefore fully pulled out of the hole and rotation of the rotary disk 9 is enabled.

In order to be able to unlock the rotary disk 9 after coupling of a magazine 2 to the travel device 3, a pivot arm 33 is mounted to pivot on the wall 16 (not shown in this figure) of the travel device 3. This pivot arm carries two pins 34, which extend into the magazine 2 and grasp the lever arm 30 between them, when the magazine 2 is coupled to the travel device 3. Pivoting of the pivot arm 33 therefore also leads to pivoting of the lever arm 30 of magazine 2 and therefore unlocking of rotary disk 9. Since the drive motor 19 is in drive connection with the rotary disk 9 via pinion 20 and gear 22 with coupling, a sleeve mounting device can be positioned by the drive motor 19. A piston-cylinder unit 35 is provided to pivot the pivot arm 33, the piston of which engages on the pivot arm 33 and is mounted to rotate in wall 16 by means of a screw. However, any other appropriate control element can also be provided for pivoting.

FIG. 6 again shows the locking and unlocking device, viewed from above (view VI-VI from FIG. 5). It is apparent in this view that the pin 34 encloses the lever arm on the right and left.

Figure 7:
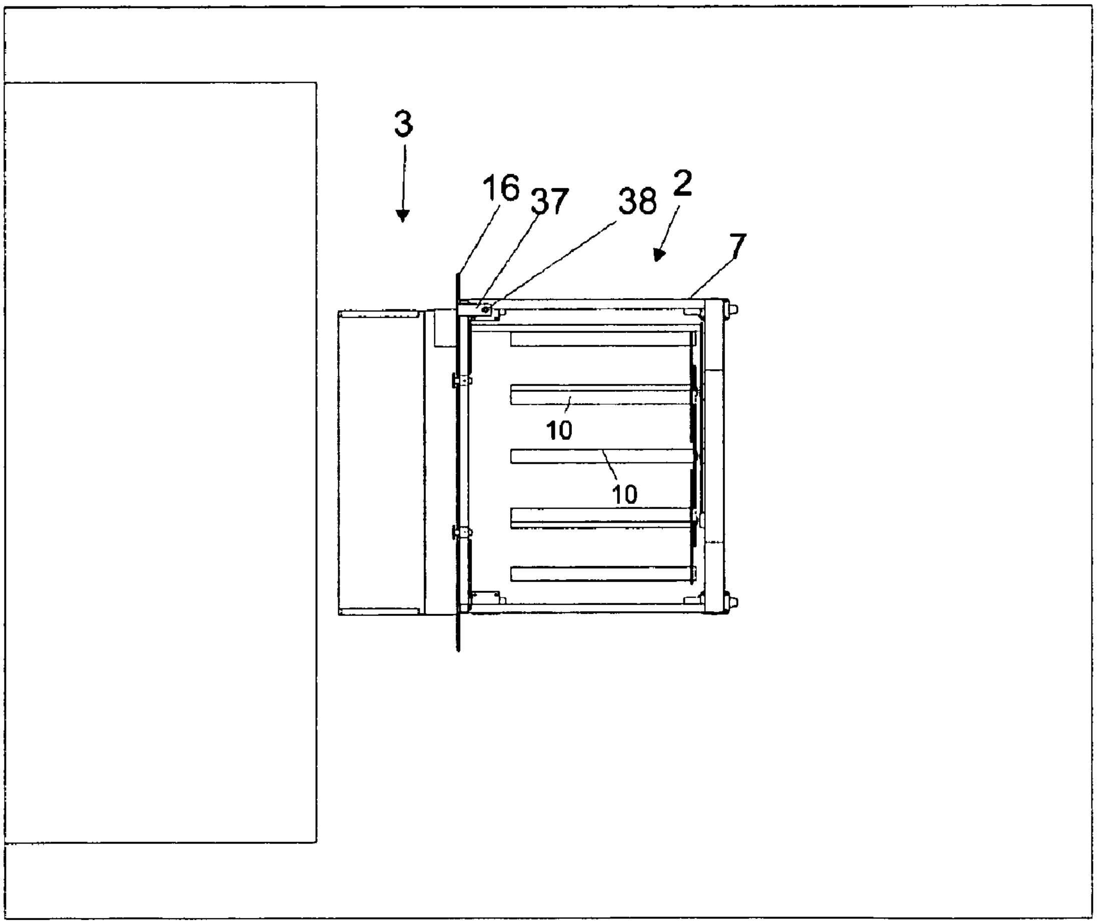
FIG. 7: View of section VII-VII in FIG. 3*a*.
Figure 8:
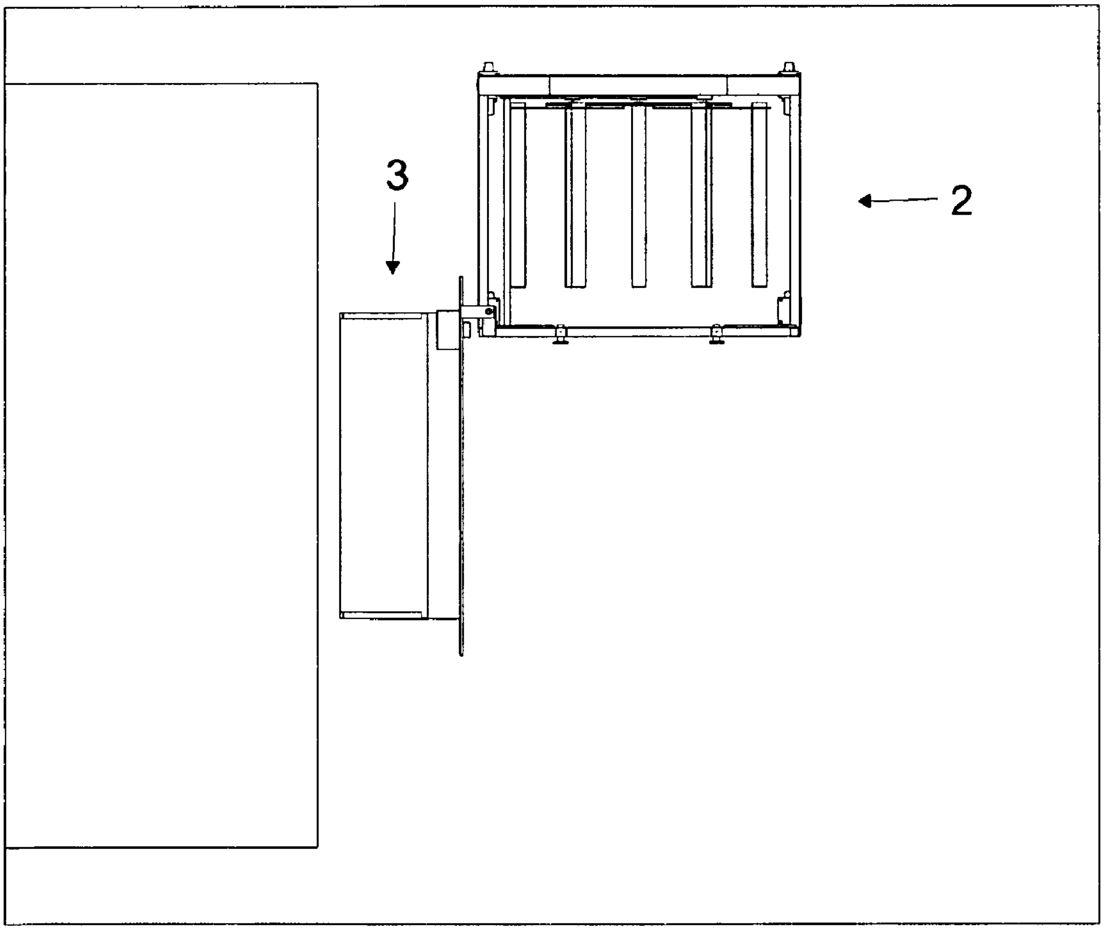
FIG. 8: View as in FIG. 7, but with the magazine pivoted away.

FIG. 7 shows a top view of the system according to the invention (view VII-VII in FIG. 3). It is apparent in this figure that a mounting plate 37 is mounted on the wall 16 of the travel device, which has a vertical hole, through which a pin 38 can be guided, which is therefore also vertically aligned. This pin 38 engages in a hole (not visible in this figure) made in the support frame 7 of magazine 2. If the magazine 2 is disconnected from the travel device 3 by lowering of the travel device, the pin 38 remains in the hole of the mounting plate 37 and in the hole of support frame 7, so that despite this connection, the magazine cannot be fully removed from the travel device. Instead, the magazine 2 can now be pivoted away from the travel device 3 around pin 38 (see FIG. 8). It is therefore prescribed to arrange the wheels 4 rotatable around their vertical axis on the base frame 6 of magazine 2. If the sleeve mounting devices now assume at least an angle, at which their axes run parallel to wall 16, the magazine can be equipped with sleeves 12 or sleeves can be removed from it. The advantage of this system is that sleeves are supplied or can be removed directly in the magazine 2 at the printing machine. These sleeves can then be transported with a small and light transport device. In addition, a sleeve change in the magazine is made possible in this way, without having to reposition and align the magazine for recoupling to the travel device, which otherwise would needlessly take considerable time.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numbers | |
|---|---|
| 1 | System for changing sleeves mountable on ink transfer roller cores |
| 2 | Magazine |
| 3 | Travel device |
| 4 | Wheel |
| 5 | Floor |
| 6 | Base frame |
| 7 | Support frame |
| 8 | Bearing |
| 9 | Rotary disk |
| 10 | Sleeve mounting device |
| 11 | Sleeve mounting device |
| 12 | Sleeve |

-continued

| List of reference numbers | |
|---|---|
| 13 | Transverse support |
| 14 | Support pin |
| 15 | Plate |
| 16 | Wall |
| 17 | Standing surface |
| 18 | Protective grate |
| 19 | Drive motor |
| 20 | Pinion |
| 21 | Shaft |
| 22 | Gear |
| 23 | Printing machine |
| 24 | Ink transfer roller core |
| 25 | Platform |
| 26 | Chain |
| 27 | Tab |
| 28 | Disk |
| 29 | Securing pin |
| 30 | Lever arm |
| 31 | Bearing |
| 32 | Spring |
| 33 | Pivot arm |
| 34 | Pin |
| 35 | Piston-cylinder unit |
| 36 | Screw |
| 37 | Mounting plate |
| 38 | Pin |

What is claimed is:

1. A system for changing sleeves that are mountable on ink transfer roller cores of a printing machine, comprising:

at least one magazine, which includes at least one sleeve mounting device adapted to move relative to a frame of the magazine at least one travel device, on which the magazine is adapted to be connected, and with which the magazine is adapted to move in at least one of the vertical direction and the horizontal direction, and at least one drive, with which a drive force or drive torque is adapted to be furnished to move the sleeve mounting device relative to the frame of the magazine, the drive being (i) a component of the travel device and (ii) adapted to be brought into effective connection with the sleeve mounting device of the magazine.

2. The system according to claim 1, wherein the drive is a motor having a rotor shaft to which a drive pinion is fastened.

3. The system according to claim 2, wherein the magazine includes a gear, which meshes with the drive pinion of the drive motor when the magazine is connected to the travel device.

4. The system according to claim 3, wherein the gear is fastened to a shaft, whose rotation causes movement of the at least one sleeve mounting device relative to the magazine.

5. The system according to claim 4, wherein the at least one sleeve mounting device is fastened to a disk mounted to rotate in the frame of the magazine.

6. The system according to claim 4, wherein the shaft transfers a torque to the disk via a torque transmission device.

7. The system according to claim 1, further comprising a locking device configured to preclude movement of the sleeve mounting device relative to the magazine.

8. The system according to claim 7, wherein the locking device includes a pin, and a component of the magazine includes a hole therein, the pin being configured to engage the hole and to participate in transfer of the drive force furnished by the drive.

9. The system according to claim 8, wherein the pin is mounted to pivot on the frame of the magazine by a lever arm, and wherein the lever arm is configured to be acted upon with a spring force in a direction toward the hole.

10. The system according to claim 7, wherein the travel device includes an adjustment device, which is configured to be connected to the locking device, and with which locking of the sleeve mounting device is eliminated.

11. The system according to claim 10, wherein the adjustment device includes a piston-cylinder unit having a piston rod that acts on a first and a second pin that enclose the lever arm of the locking device.

* * * * *